United States Patent
Lim et al.

(10) Patent No.: US 10,257,862 B2
(45) Date of Patent: Apr. 9, 2019

(54) RANDOM ACCESS METHOD AND APPARATUS BASED ON ANALOG NETWORK CODING FOR TWO-WAY RELAY CHANNEL

(71) Applicant: AJOU UNIVERSITY INDUSTRY-ACADEMIC COOPERATION FOUNDATION, Suwon-si, Gyeonggi-do (KR)

(72) Inventors: Jae Sung Lim, Suwon-si (KR); Hong Jun Noh, Suwon-si (KR); Kyu Man Lee, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 51 days.

(21) Appl. No.: 14/725,820

(22) Filed: May 29, 2015

(65) Prior Publication Data
US 2016/0081121 A1    Mar. 17, 2016

(30) Foreign Application Priority Data
Sep. 15, 2014    (KR) .................. 10-2014-0122292

(51) Int. Cl.
H04W 74/08    (2009.01)
H04B 1/10    (2006.01)
H04B 7/15    (2006.01)

(52) U.S. Cl.
CPC .......... H04W 74/0833 (2013.01); H04B 1/10 (2013.01); H04B 7/15 (2013.01); H04W 74/085 (2013.01); H04W 74/0858 (2013.01)

(58) Field of Classification Search
None
See application file for complete search history.

(56) References Cited

U.S. PATENT DOCUMENTS

| 6,868,112 B2 | 3/2005 | Kim et al. | 375/147 |
| 7,701,961 B2* | 4/2010 | Lim | H04B 7/216 370/316 |
| 8,040,987 B2 | 10/2011 | Oh et al. | 375/349 |

(Continued)

FOREIGN PATENT DOCUMENTS

| KR | 10-0249814 B1 | 4/2000 |
| KR | 2000-0027060 A | 5/2000 |

(Continued)

Primary Examiner — Kashif Siddiqui
Assistant Examiner — Mehedi S Aley
(74) Attorney, Agent, or Firm — Stein IP, LLC

(57) ABSTRACT

The present invention generally relates to a random access method and apparatus based on analog network coding for a satellite network and, more particularly, to technology that combines analog network coding with random access, thus guaranteeing high channel usage efficiency upon utilizing the technology for a satellite positioning/communications convergence system. For this, a random access apparatus based on analog network coding for a satellite network according to an embodiment of the present invention includes a received signal determination unit, a data packet transmission unit, a reserved slot decision unit, a response message reception unit, and a data packet decoding unit.

16 Claims, 7 Drawing Sheets

(56) References Cited

U.S. PATENT DOCUMENTS

| | | | |
|---|---|---|---|
| 8,094,672 B2 | 1/2012 | Casini et al. | 370/447 |
| 8,155,046 B2 | 4/2012 | Jung et al. | 370/315 |
| 8,346,171 B1* | 1/2013 | Mack | H04W 52/0206 455/63.1 |
| 8,913,540 B2 | 12/2014 | Gao et al. | 370/312 |
| 2002/0114313 A1* | 8/2002 | Walsh | H04B 7/18584 370/348 |
| 2005/0250506 A1* | 11/2005 | Beale | H04L 5/0037 455/452.1 |
| 2010/0124222 A1 | 5/2010 | Liva | 370/389 |
| 2011/0078355 A1* | 3/2011 | Tan | G06F 13/4273 710/305 |
| 2011/0143655 A1* | 6/2011 | Ahn | H04B 7/15542 455/9 |
| 2014/0287679 A1 | 9/2014 | Lim et al. | 455/12.1 |
| 2017/0187513 A9* | 6/2017 | Bharadia | H04L 5/1461 |

FOREIGN PATENT DOCUMENTS

| | | | |
|---|---|---|---|
| KR | 10-0414510 B1 | 2/2004 | |
| KR | 10-0429183 B1 | 6/2004 | |
| KR | 10-0471538 B1 | 2/2005 | |
| KR | 10-2008-0046764 | 5/2008 | |
| KR | 10-0962114 | 6/2010 | |
| KR | 10-2010-0089166 A | 8/2010 | |
| KR | 10-1270008 | 5/2013 | |
| KR | 10-1301298 B1 | 8/2013 | |
| KR | 10-2013-0098276 | 9/2013 | |
| KR | 10-2013-0133463 | 12/2013 | |
| KR | 10-1355799 B1 | 1/2014 | |
| KR | 10-1491818 | 2/2015 | |
| KR | 10-0614410 | 8/2016 | |
| WO | WO 2013/180332 A1 | 12/2013 | |
| WO | WO 2015065281 A1 * | 5/2015 | H04W 74/0858 |

* cited by examiner

RANDOM ACCESS METHOD AND APPARATUS BASED ON ANALOG NETWORK CODING FOR TWO-WAY RELAY CHANNEL

CROSS-REFERENCE TO RELATED APPLICATIONS

This application claims the benefit of priority of Korean Application No. 10-2014-0122292, filed Sep. 15, 2014, in the Korean Intellectual Property Office. The disclosure of the document named above is incorporated herein by reference.

BACKGROUND OF THE INVENTION

1. Field of the Invention

The present invention relates, in general, to a random access method and apparatus based on analog network coding for a two-way relay channel and, more particularly, to technology for combining analog network coding with random access, thus guaranteeing high channel usage efficiency upon utilizing the combined technology for a system that uses a two-way relay channel.

2. Description of the Related Art

A satellite network, which is a representative two-way relay channel network, is advantageous in that it can be shared by terminal stations located across a large area, but it has the limitation of high cost for the use of the network. Therefore, in a satellite network, high-efficiency communication techniques optimized for respective cases where the amount of data to be transmitted is large or small have been used.

Generally, in a satellite network, demand assign techniques and random access techniques are used in parallel with each other. Since this random access technique has very low system throughput, its use is limited to the case when the amount of transmission traffic is not large in the satellite network. In particular, it is known that 1970's slotted ALOHA, one random access technique, has an efficiency of 37% and the highest system throughput, and is not used when the amount of traffic is large, as in the case of data traffic of application programs. Such a technique is limited to use only when the amount of traffic is small, as in the case of network control data or system management messages. In contrast, the demand assign technique is used when the amount of traffic is large, and Demand Assigned Multiple Access (DAMA) is chiefly used as the demand assign technique. However, DAMA is problematic in that, when an amount of traffic less than demand-assigned traffic is generated, an amount of network resources corresponding to the difference between actual traffic and basic demand-assigned traffic is wasted.

Further, the random access technique is characterized in that it copes better than the demand assign technique with traffic having intermittent characteristics, but it is problematic in that its use in a satellite network is difficult due to low system throughput. Further, conventional schemes for improving the system throughput of the random access technique have been presented, but the improvement level thereof is not sufficient, and the increase in the efficiency of channel use is limited.

Meanwhile, a satellite communication system has been used to separate an uplink frequency to a satellite from a downlink frequency so as to avoid channel interference. Accordingly, the satellite communication system has, as a basic channel, a two-way relay channel, which utilizes a satellite relay. Further, in a recent relay system, an Analog Network Coding (ANC) technique for increasing throughput up to double that of an existing scheme has been proposed. ANC simultaneously transmits uplink and downlink signals in a single frequency band and a single time slot, and the simultaneously transmitted uplink and downlink signals overlap each other and are then received. The core of the above-described ANC may be regarded as interference cancellation (IC) technology for allowing a certain terminal to recover a received signal by removing a signal transmitted by the terminal from an overlapping signal. Such IC technology may be used independent of modulation technique or channel coding.

It is predicted that such ANC may greatly improve throughput when it is applied to satellite random access. However, when ANC is applied to random access, a problem may arise in that it is impossible to utilize ANC due to unintentional packet collisions. Further, there is a problem in that a physical layer cannot estimate precise channel values for the channel through which each packet is transmitted, so that the resultant error entirely acts as an interference factor, thus making it impossible to recover packets even if interference is cancelled.

Meanwhile, Korean Patent No. 10-0414510 entitled "Temporary Frame Identification for ARQ in a Reservation-Slotted-ALOHA Type of Protocol" presents a method of implementing an automatic repeat request (ARQ) in a mobile packet communications system using a reservation slotted-ALOHA protocol in which data frames, each having multiple data blocks, are exchanged between a base station and mobile stations, the method including the step of assigning, to each data frame transmitted to a mobile station, a Temporary Frame Identity (TFI), wherein the assigned TFI is unique among other TFIs assigned to data frames concurrently transmitted to other mobile stations, and the step of including the assigned TFI in all data blocks in the data frame to which the TFI is assigned.

The preceding technology is a technology using a Reservation ALOHA (R-ALOHA) technique in which a single terminal reserves and utilizes a single slot. Such R-ALOHA is configured to, when the transmission of a packet succeeds, reserve the corresponding slot, maintain the reservation of the slot by continuously transmitting packets in the slot, and terminate the reservation of the slot by inserting an end-of-file flag into the last transmitted packet upon terminating reservation. When channel reservation for ANC is performed using such an R-ALOHA technique, a problem arises in that information inside a packet cannot be determined by terminals other than the two terminals that desire to exchange information using ANC (hereinafter referred to an "ANC pair"), due to the transmission of overlapping signals. As a result, a problem arises in that other terminals cannot determine whether the corresponding slot is a slot in which communication based on ANC is performed or a slot in which packets are colliding with each other.

SUMMARY OF THE INVENTION

An object of the present invention is to provide a random access method and apparatus based on analog network coding for a two-way relay channel. As an example of a well-known network of various networks that use a two-way relay channel, a satellite network may be presented.

Another object of the present invention is to provide random access technology that is capable of guaranteeing high channel usage efficiency when applied to a satellite positioning/communications convergence system.

A further object of the present invention is to improve throughput by applying analog network coding (ANC) technology to satellite random access.

Yet another object of the present invention is to propose analog network coding ALOHA (ANC-ALOHA), which is a new random access technique for utilizing the advantage of ANC for random access.

Still another object of the present invention is to solve a conventional problem occurring when channel reservation for ANC is performed using conventional R-ALOHA technology, that is, the problem in that information inside a packet cannot be determined by terminals other than terminals corresponding to an ANC pair due to the transmission of an overlapping signal required for ANC execution, and an attendant problem in that other terminals cannot determine whether the corresponding slot is a slot in which communication based on ANC is performed or a slot in which packets are colliding with each other.

In order to accomplish the above objects, a random access method based on analog network coding for a satellite network according to an embodiment of the present invention includes receiving, by a first terminal station, a communication channel for one frame period of a communication network and determining a status of occupation of each slot, selecting, by the first terminal station, an empty slot as a first slot, and transmitting a first data packet for analog network coding in the selected first slot over the communication network, receiving, by the first terminal station, data in the first slot in which the first data packet is transmitted, and determining whether a collision has occurred between the transmitted first data packet and any additional data packet in the first slot, and deciding on, by the first terminal station, the first slot as a reserved slot if a collision has not occurred in the first slot.

Further, the random access method may further include, if the first data packet from the first terminal station has been transmitted in the first slot without causing a collision, receiving, by the first terminal station, a response message sent from a second terminal station, which is a counterpart of communication based on analog network coding, in the first slot of a subsequent frame or in a second slot of a current frame, and confirming, by the first terminal station, the first slot as the reserved slot, based on the received response message.

Furthermore, the random access method may further include transmitting, by the first terminal station, a second data packet for analog network coding in the first slot, decided on as the reserved slot, over the communication network, receiving, by the first terminal station, a signal to which analog network coding is applied in the first slot, and applying, by the first terminal station, an interference cancellation technique based on the second data packet to the signal received in the first slot and then decoding a third data packet, transmitted from the second terminal station for analog network coding.

Furthermore, the random access method may further include transmitting, by the first terminal station, a second data packet for analog network coding in the first slot, decided on as the reserved slot, over the communication network, wherein the second data packet includes a sequence code allowing terminal stations other than the first terminal station and a second terminal station, which is a counterpart of communication based on analog network coding, to recognize that the first slot is a reserved slot for communication based on analog network coding. The random access method may further include defining, by the first terminal station, a sequence code to be utilized as a preamble and a postamble of a second data packet for analog network coding in the first slot, decided on as the reserved slot, and transmitting, by the first terminal station, the second data packet including the sequence code in the first slot over the communication network.

Furthermore, the random access method may further include receiving, by the first terminal station, a signal to which analog network coding is applied in the first slot, and applying, by the first terminal station, an interference cancellation technique to the signal received in the first slot while using the sequence code as a synchronization signal, and then decoding a third data packet, transmitted from the second terminal station for analog network coding. In this case, transmitting the second data packet over the communication network may include transmitting, by the first terminal station, the second data packet earlier or later than a third data packet, transmitted from the second terminal station for analog network coding, so as to receive at least part of the sequence code without interference.

Furthermore, the random access method may further include, if the first data packet from the first terminal station has been transmitted in the first slot without causing a collision, receiving, by the first terminal station, a response message sent from the second terminal station, which is a counterpart of communication based on analog network coding, in the first slot of a subsequent frame or in a second slot of a current frame, wherein transmitting the second data packet over the communication network includes determining whether to transmit the second data packet earlier or later than the third data packet, depending on a sequence of a 2-way handshake protocol, in which the response message is sent or received between the first terminal station and the second terminal station. In this case, transmitting the second data packet over the communication network may include transmitting, by the first terminal station, the second data packet, with a payload size of the second data packet being reduced, so as to receive at least part of the sequence code without interference.

In addition, a random access apparatus based on analog network coding for a satellite network according to an embodiment of the present invention includes a processor. The processor may include a received signal determination unit, a data packet transmission unit, a reserved slot decision unit, a response message reception unit, and a data packet decoding unit as sub-modules.

Further, the received signal determination unit may allow a first terminal station to receive a communication channel for one frame period of a communication network and determine a status of occupation of each slot, the data packet transmission unit may allow the first terminal station to select an empty slot as a first slot, and transmit a first data packet for analog network coding in the selected first slot over the communication network, and the reserved slot decision unit may allow the first terminal station to decide on the first slot as a reserved slot if a collision has not occurred in the first slot, wherein the received signal determination unit may allow the first terminal station to receive data in the first slot, in which the first data packet is transmitted, and determines whether a collision has occurred between the transmitted first data packet and any additional data packet in the first slot.

Furthermore, the processor of the random access apparatus may further include a response message reception unit for, if it is determined that the first data packet from the first terminal station has been transmitted in the first slot without causing a collision, allowing the first terminal station to receive a response message sent from a second terminal station, which is a counterpart of communication based on analog network coding, in the first slot of a subsequent frame or in a second slot of a current frame, wherein the reserved slot decision unit may allow the first terminal station to confirm the first slot as a reserved slot, based on the received response message.

Furthermore, the processor of the random access apparatus may further include a data packet decoding unit for allowing the first terminal station to apply an interference cancellation technique based on a second data packet to the signal received in the first slot and then decoding a third data packet, transmitted from a second terminal station for analog network coding, wherein the data packet transmission unit allows the first terminal station to transmit the second data packet for analog network coding in the first slot, decided on as the reserved slot, over the communication network, and the received signal determination unit allows the first terminal station to receive a signal to which analog network coding is applied in the first slot.

Furthermore, the data packet transmission unit may allow the first terminal station to transmit a second data packet for analog network coding in the first slot, decided on as the reserved slot, over the communication network, and the second data packet may include a sequence code allowing terminal stations other than the first terminal station and a second terminal station, which is a counterpart of communication based on analog network coding, to recognize that the first slot is a reserved slot for communication based on analog network coding.

Furthermore, the processor of the random access apparatus may further include a sequence code definition unit for allowing the first terminal station to define a sequence code to be utilized as a preamble and a postamble of a second data packet for analog network coding in the first slot decided on as the reserved slot, wherein the data packet transmission unit allows the first terminal station to transmit the second data packet including the sequence code in the first slot over the communication network.

Furthermore, the received signal determination unit may allow the first terminal station to receive a signal to which analog network coding is applied in the first slot, and the data packet decoding unit may allows the first terminal station to apply an interference cancellation technique to the signal received in the first slot while using the sequence code as a synchronization signal, and then decodes a third data packet, transmitted from the second terminal station for analog network coding.

Furthermore, the data packet transmission unit may allow the first terminal station to transmit the second data packet earlier or later than a third data packet, transmitted from the second terminal station for analog network coding, so as to receive at least part of the sequence code without interference.

Furthermore, the processor of the random access apparatus may further include a response message reception unit for, if the first data packet from the first terminal station has been transmitted in the first slot without causing a collision, allowing the first terminal station to receive a response message sent from the second terminal station, which is a counterpart of communication based on analog network coding, in the first slot of a subsequent frame or in a second slot of a current frame, wherein the data packet transmission unit determines whether to transmit the second data packet earlier or later than the third data packet depending on a sequence of a 2-way handshake protocol, in which the response message is sent or received between the first terminal station and the second terminal station.

Furthermore, the data packet transmission unit may allow the first terminal station to transmit the second data packet, with a payload size of the second data packet being reduced, so as to receive at least part of the sequence code without interference.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Hereinafter, embodiments of the present invention will be described in detail with reference to the accompanying drawings. In the following description, detailed descriptions of known elements or functions that may unnecessarily make the gist of the present invention obscure will be omitted. Further, in the description of the following embodiments of the present invention, detailed numerals merely indicate exemplary values.

The present invention generally relates to a random access method and apparatus based on analog network coding for a satellite network and, more particularly, to technology for combining analog network coding with random access, thus guaranteeing high channel usage efficiency when applied to a satellite positioning/communications convergence system.

The present invention may be applied to all networks that employ a scheme in which a signal received via a two-way relay channel, that is, a relay node, is broadcasted to two terminal stations. As a well-known example of such a network that uses a two-way relay channel, a satellite network may be presented. Hereinafter, for convenience of description, the configuration of the present invention will be described in detail using a satellite network-based embodiment. However, the following embodiments are only examples, and the spirit of the present invention is not limited by those embodiments.

Figure 5:
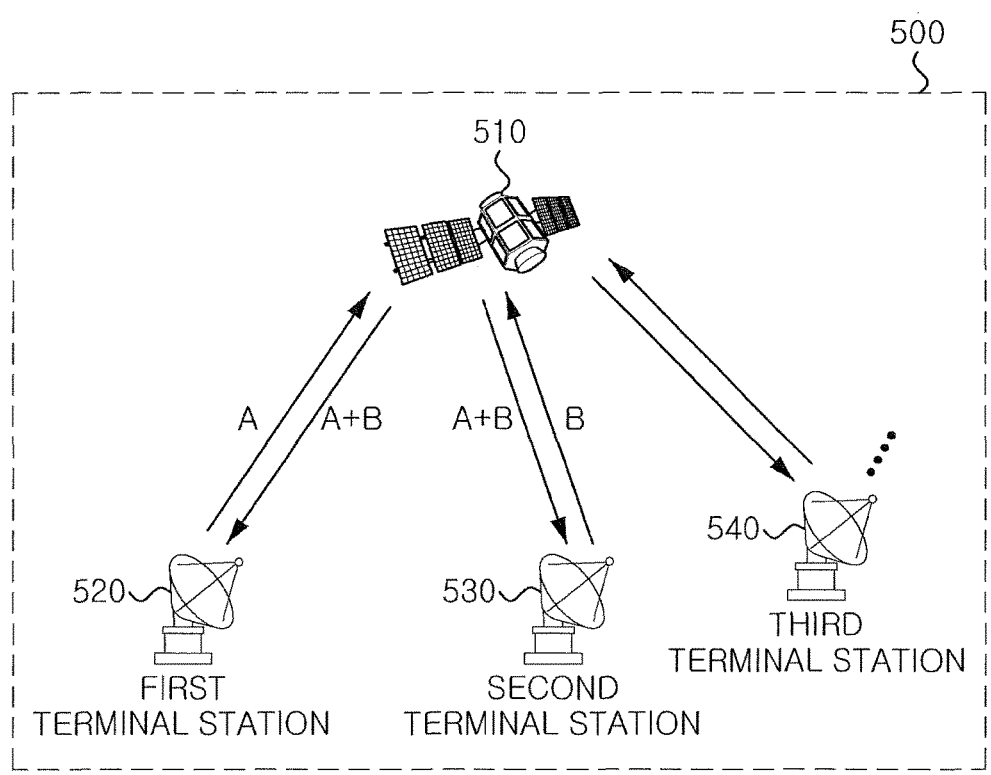
FIG. 5 is a diagram showing a process for performing communication based on analog network coding in a random access-type satellite network according to an embodiment of the present invention.

FIG. 5 is a diagram showing a process for performing communication based on analog network coding in a random access-type satellite network according to an embodiment of the present invention.

Referring to FIG. 5, a satellite network 500 according to an embodiment of the present invention includes a satellite 510 and one or more terminal stations 520, 530, and 540.

Here, each of the terminal stations 520, 530, and 540 may be a concept including one or more of a communication terminal/communication device such as a mobile phone, a transmission/reception device installed on a ship or a vehicle, and a satellite signal receiver.

Further, referring to FIG. 5, the process in which communication based on analog network coding is performed between the first terminal station 520 and the second terminal station 530 is illustrated. That is, each of the first terminal station 520 and the second terminal station 530 transmits a data packet to the satellite 510 over a satellite network. The relay of the satellite 510 merely amplifies an overlapping signal based on data packets, respectively transmitted from the first terminal station 520 and the second terminal station 530, and transmits back the amplified overlapping signal to the first terminal station 520 and the second terminal station 530. That is, 'A' denotes a data packet transmitted from the first terminal station 520 to the satellite 510, and 'B' denotes a data packet transmitted from the second terminal station 530 to the satellite 510. Further, the relay of the satellite 510 transmits an overlapping signal A+B of packets A and B to the first terminal station 520 and the second terminal station 530.

Meanwhile, based on the satellite 510, the direction in which signals are transmitted from the ground to the satellite 510 is called an uplink, and the direction in which signals are transmitted from the satellite 510 to the ground is called a downlink. That is, A and B are respectively transmitted to the satellite 510 through uplinks, and A+B is transmitted both to the first terminal station 520 and the second terminal station 530 through downlinks.

Since the first terminal station 520 knows that data packet A, transmitted thereby, is included in the overlapping received signal A+B, it may decode the data packet B, transmitted from the second terminal station 530, by performing Interference Cancellation (IC) to eliminate the data packet A from the overlapping received signal A+B. Similarly, since the second terminal station 530 knows that data packet B transmitted thereby is included in the overlapping received signal A+B, it may decode the data packet A, transmitted from the first terminal station 520, by performing interference cancellation to eliminate the data packet B from the overlapping received signal A+B.

For convenience of illustration and description, although not shown in detail in FIG. 5, the third terminal station 540 receives the overlapping received signal A+B in a slot in which analog network coding-based communication is performed. In this case, the third terminal station 540 needs to determine whether communication is performed between the first terminal station 520 and the second terminal station 530 in the corresponding slot, or whether a collision between packets is occurring. The protocol for this determination will be described below.

Further, although an example of communication based on the satellite has been illustrated in FIG. 5, the spirit of the present invention may be applied to all networks that employ a scheme for broadcasting signals received via a 2-way relay channel, that is, a relay node, to two terminal stations, without being limited to satellite communication networks.

Meanwhile, the above description may be summarized below. In order to avoid channel interference, a satellite communication system separates an uplink frequency to the satellite from a downlink frequency and uses the separated frequencies. Such a satellite communication system basically uses a two-way relay channel that exploits a satellite relay. Further, in a recent relay system, Analog Network Coding (ANC) for increasing throughput up to double the existing throughput has been proposed. ANC simultaneously transmits uplink and downlink signals in a single frequency band and a single time slot, and the simultaneously transmitted uplink and downlink signals have the characteristic of overlapping and being received. The core of ANC may be regarded as IC technology for allowing a certain terminal to recover a received signal by removing a signal transmitted thereby from an overlapping signal. Such IC technology may be used independent of modulation technique or channel coding.

When such ANC technology is applied to random access, there are advantages not only of guaranteeing high channel usage efficiency, but also of improving data throughput. However, in order to apply ANC to random access, the following problem must be solved.

First, to guarantee successful ANC, two terminals desiring to exchange information using only ANC (hereinafter referred to as an "ANC pair") must access the same slot without interference from other terminals. The reason for this is that it is difficult to guarantee that the ANC pair will simultaneously access a single slot due to the characteristics of contention-based random access, and that there is a possibility that terminals other than the terminals of the ANC pair may simultaneously access the slot due to the properties of the random access channel even if the terminals of the ANC pair have simultaneously accessed the slot, and there is a possibility that ANC may not be utilized due to unintentional packet collisions attributable to such simultaneous access. Second, in order to utilize ANC for random access, a physical layer must estimate precise channel values (e.g., frequency, phase, amplitude, etc.) for the channel through which each packet is transmitted. The reason for this is that, when precise channel values are not estimated, the resultant error may act as an interference factor, thus making it impossible to recover the packet even if interference cancellation (IC) technology is applied.

Therefore, the present invention may solve the above problem, and proposes ANC-ALOHA, which is a new random access technique for utilizing the advantage of ANC for random access.

In the present invention, a channel reservation technique is used as a method by which terminals forming an ANC pair simultaneously access a single slot in the above problems. In the prior art, as a technique in which a single terminal reserves and utilizes a single slot, Reservation ALOHA (R-ALOHA) was proposed. Such conventional R-ALOHA is characterized in that, when the transmission of a packet succeeds, a relevant slot is reserved, the reservation of the slot is maintained by successively transmitting packets in the slot, and the reservation of the slot is terminated by inserting an end-of-file flag into the last packet to be transmitted upon terminating reservation. However, when channel reservation for ANC is performed via such R-ALOHA, a problem arises in that it is impossible for terminals other than the terminals forming the ANC pair to determine the information inside a packet due to the transmission of an overlapping signal required for ANC execution. Further, due thereto, a problem also arises in that other terminals cannot determine whether the relevant slot is a slot in which communication based on ANC is performed or a slot in which a packet collision is occurring. Hence, the present invention proposes an ANC-ALOHA technique that utilizes both a 2-way handshake (2WH) and a keep-on sequence to solve the above-described problems.

First, the 2-way handshake (2WH) and the keep-on sequence that are utilized in the ANC-ALOHA technique proposed in the present invention will be described in brief. Thereafter, the individual components of the present invention will be described in greater detail.

The 2WH proposed in the present invention denotes a procedure in which two terminals forming an ANC pair (hereinafter referred to as a 'first terminal station' and a 'second terminal station'), which desire to exchange information using ANC, reserve a single slot to be used for ANC communication. In this case, when either one of the terminals of the ANC pair (corresponding to the 'first terminal station') succeeds in data transmission in a current channel, the corresponding slot is reserved in the same manner as the R-ALOHA. Further, the other terminal of the ANC pair (corresponding to the 'second terminal station') sends a response message in a subsequent frame, thus indicating whether ANC is available. If the ANC pair is unavailable for communication, the corresponding slot remains as an empty slot, and reservation is naturally released. The ANC pair then performs communication based on ANC from the frame following the 2WH procedure.

Further, the keep-on sequence proposed in the present invention is a sequence code allowing terminal stations other than the terminals forming the ANC pair to recognize that the single reserved slot is a reserved slot for communication that uses analog network coding. In this case, the terminals other than the terminals forming the ANC pair may determine that the corresponding slot has been reserved, without receiving all information about packets transmitted via ANC, by receiving the keep-on sequence, with the result that unintentional collisions between packets may be prevented by means of such determination. Further, the ANC-ALOHA of the present invention defines the keep-on sequence, and uses it as a preamble and a postamble for packets that are transmitted during ANC communication. At this time, the keep-on sequence is implemented as a pseudo-noise code, and must be distinguished from an existing preamble and an existing postamble. Further, the ANC pair estimates channel values using a keep-on sequence, and acquires synchronization for Interference Cancellation (IC). In order to desirably perform the function of the keep-on sequence, at least part of the keep-on sequence of each ANC packet must be received without interference. At this time, the ANC packet denotes a data packet for analog network coding, which is transmitted from the ANC pair (i.e. the first terminal station and the second terminal station of the present invention). To achieve the above object, the ANC-ALOHA proposed in the present invention uses a reduced payload size and delayed transmission.

Below, the reduced payload size and delayed transmission will be described in brief. The reduced payload size literally denotes the reduction of the size of the payload of an ANC packet by an amount corresponding to the sum of the preamble size and a guard time. Further, delayed transmission literally denotes delaying transmission, wherein one of two ANC packets transmitted from respective terminals of the ANC pair is transmitted after being delayed from a slot boundary by a time corresponding to the sum of the preamble size and the guard time. In this case, which terminal will perform delayed transmission is determined according to the sequence of 2WH.

Hereinafter, individual components of the present invention will be described in greater detail with reference to the attached drawings.

Prior to the description of the components, the terms used to describe the present invention will be described. In the present invention, an ANC pair denotes two terminals that desire to exchange information with each other using ANC, a first terminal station denotes a transmitting side terminal station of the ANC pair, and a second terminal station denotes a counterpart terminal station of the first terminal station of the ANC pair. For convenience of description, a first data packet is defined as a data packet that is transmitted from the first terminal station so as to reserve an empty slot as a reserved slot or a preliminary reserved slot, and a second data packet is defined as a data packet that is transmitted from the first terminal station for actual ANC communication. Furthermore, a third data packet is defined as a data packet that is transmitted from the second terminal station for actual ANC communication.

That is, ANC packets refer to data packets for ANC, which are transmitted from the ANC pair (i.e. the first terminal station and the second terminal station), and may denote a second data packet and a third data packet. Compared with the items shown in FIG. 5, data packet A, transmitted from the first terminal station 520 of FIG. 5, may be regarded as a second data packet, and data packet B, transmitted from the second terminal station 530, may be regarded as a third data packet.

In this regard, the preliminary reserved slot is required to solve the above-described problem, that is, the problem in which the terminals of the ANC pair must access the same slot (hereinafter referred to as a 'first slot'), in order to apply ANC to random access. At this time, ANC communication is not necessarily performed even if the first terminal station has succeeded in the transmission of a data packet for ANC communication in a first slot. In other words, after the first terminal station has successfully transmitted a data packet for ANC communication in the first slot, when the second terminal station also successfully transmits a data packet for ANC communication in the first slot of a subsequent frame or in the second slot of the same (current) frame, that is, when data packets for ANC communication respectively transmitted from the first terminal station and the second terminal station are received without a collision, the first slot is then confirmed as a reserved slot for ANC communication. In this regard, in 2-way handshaking according to the present invention, a first embodiment may be defined as an embodiment in which, after the first terminal station has successfully transmitted a data packet for ANC communication in a first slot, the second terminal station successfully transmits a data packet for ANC communication in the first slot of a subsequent frame. Further, a second embodiment may be defined as an embodiment in which the second terminal station successfully transmits a data packet for ANC communication in the second slot of the same frame. Here, the data packet for ANC communication, transmitted from the second terminal station, may be regarded as a response message. Detailed descriptions of the first embodiment and the second embodiment will be made later.

Therefore, in the present invention, the case where the first terminal station successfully transmits a data packet for ANC communication in the first slot is represented by the case where the first slot has been decided on as a preliminary reserved slot. Further, the case where data packets for ANC communication, respectively transmitted from the first terminal station and the second terminal station, are received in the first slot without causing any collision, that is, the case where the data packets transmitted not only from the first terminal station but also from the second terminal station in the first slot have been successfully received, is represented by the case where the first slot is confirmed as a reserved slot.

Meanwhile, in the case of a third data packet, the first terminal station and the second terminal station transmit data packets for ANC in the same slot (i.e. the first slot), and the satellite relay merely amplifies an overlapping signal received from the first terminal station and the second terminal station, and transmits the amplified signal both to the first terminal station and to the second terminal station. In this case, the first terminal station uses an interference cancellation technique to acquire the signal, transmitted from the second terminal station, from the overlapping signal. That is, the third data packet is a data packet for ANC that is transmitted from the second terminal station and is extracted from the overlapping signal received by the first terminal station using the interface cancellation technique. Alternatively, the third data packet is a data packet for ANC, which is transmitted from the second terminal station and which is decoded by applying the interference cancellation technique based on the second data packet to the overlapping signal. That is, the third data packet is a data packet for ANC that is transmitted by the second terminal station. Based on the above description, the individual components of the present invention will be described in detail.

Figure 1:
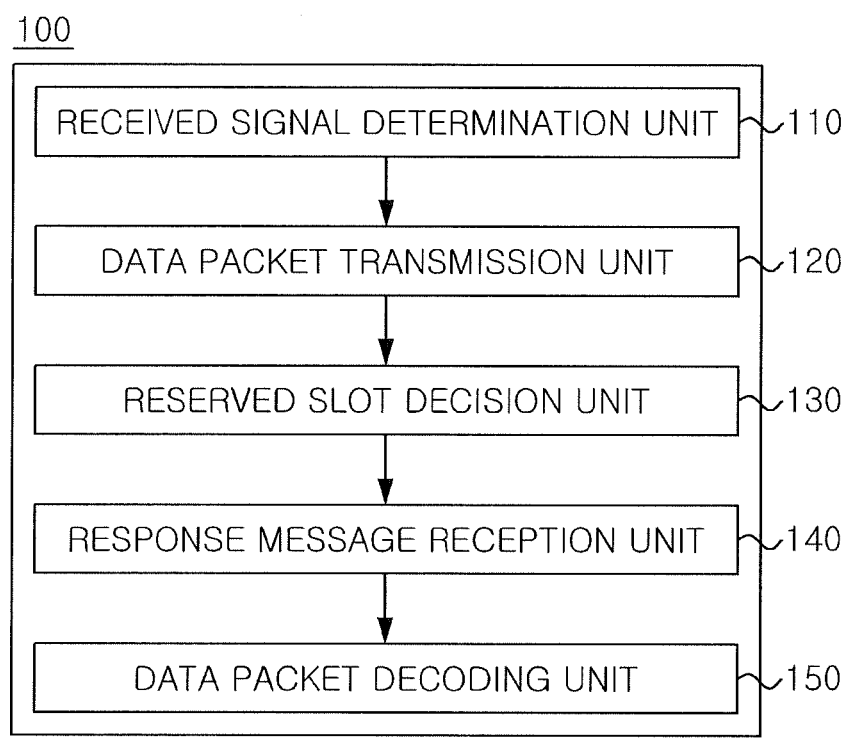
FIG. 1 is a schematic configuration diagram of a random access apparatus based on analog network coding for a satellite network according to an embodiment of the present invention.

FIG. 1 is a schematic configuration diagram showing a random access apparatus based on ANC for a satellite network according to an embodiment of the present invention.

Referring to FIG. 1, a random access apparatus 100 based on analog network coding according to the present invention may include a received signal determination unit 110, a data packet transmission unit 120, a reserved slot decision unit 130, a response message reception unit 140, and a data packet decoding unit 150.

The received signal determination unit 110 allows a first terminal station (i.e. the transmitting side of an ANC pair) to receive a communication channel for one frame period of a communication network, and determines the status of occupation of a slot.

The data packet transmission unit 120 allows the first terminal station to select an empty slot as a first slot, and transmits a first data packet for analog network coding (i.e. a data packet for the reservation of the empty slot) in the selected first slot over the communication network. Here, the first slot denotes the number of a slot in a frame. For example, when slot No. 3 is decided on as the first slot, slot No. 3 is still the first slot in a subsequent frame.

The reserved slot decision unit 130 allows the first terminal station to decide on the first slot as a preliminary reserved slot if no collision has occurred between the transmitted first data packet and any additional data packet in the first slot.

Here, when the first terminal station successfully transmits the data packet for ANC communication in the first slot, the reserved slot decision unit 130 decides on the first slot as a preliminary reserved slot. Thereafter, when data packets for ANC communication, respectively transmitted from the first terminal station and the second terminal station, are received in the first slot without causing a collision, that is, when the data packets transmitted not only from the first terminal station but also from the second terminal station in the first slot have been successfully received, the reserved slot decision unit 130 may confirm the first slot, decided on as the preliminary reserved slot, as the reserved slot. Further, the ANC pair performs communication based on ANC from the frame following the confirmation of the first slot as the reserved slot, which means that two terminals desiring to exchange information with each other using ANC, that is, the ANC pair (i.e. the first terminal station and the second terminal station), have achieved a 2-way handshake (2WH) condition in which a single slot is reserved to utilize the slot for ANC communication.

The received signal determination unit 110 allows the first terminal station to receive data in the first slot in which the first data packet is transmitted, and determines whether a collision between the transmitted first data packet and any additional data packet has occurred in the first slot.

The response message reception unit 140 is configured to, when the first data packet transmitted from the first terminal station is received in the first slot without causing a collision, allow the first terminal station to receive a response message sent from the second terminal station, which is a counterpart terminal of communication based on ANC, in the first slot of a subsequent frame or in the second slot of the current frame. The reserved slot decision unit 130 allows the first terminal station to confirm the first slot from the preliminary reserved slot as the reserved slot, based on the received response message.

Here, the condition in which the second terminal station sends a response message will be described below. That is, the second terminal station may monitor in real time the status of each slot and determine whether a signal received in the slot is a data packet directed thereto. Accordingly, the second terminal station is configured to, if it is determined that the data packet directed thereto is a packet for ANC and is also a signal that was successfully received in the first slot without causing a collision, send a response message in response to the signal. Here, any other terminal stations as well as the second terminal station may be provided with a function of monitoring the status of each slot and determining received signals. In other words, the condition in which the second terminal station sends a response message is that the second terminal station itself determines a received signal and sends a response message to the received signal if a data packet directed to the second terminal station is a packet for ANC and is also a signal that was successfully received in the first slot without causing a collision. The second terminal station indicates whether ANC is available by sending a response message. Meanwhile, if the ANC pair is unavailable for communication, the first slot remains as an empty slot, and reservation is naturally released.

Figure 6:
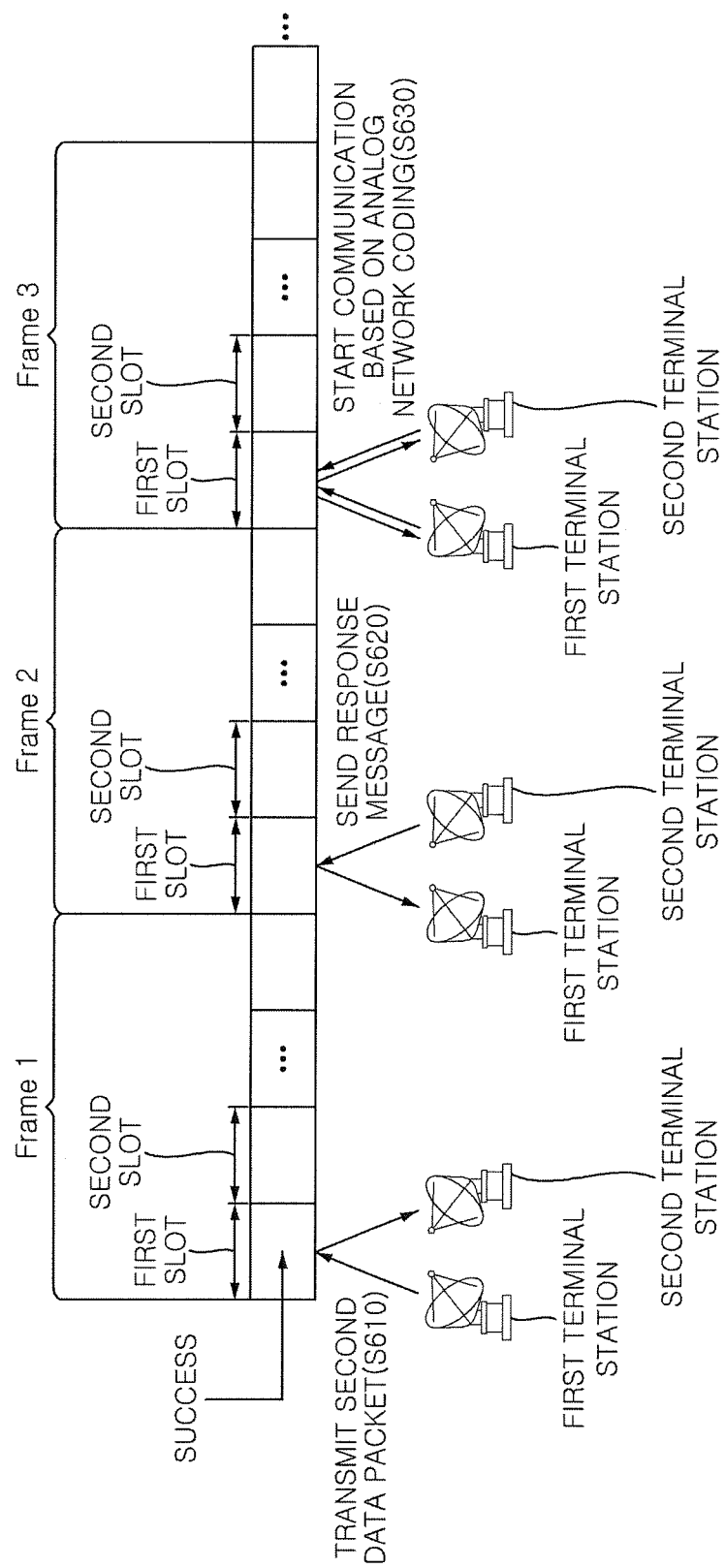
FIG. 6 is a diagram showing a 2-way handshake (2WH) protocol process according to a first embodiment of the present invention.

Meanwhile, FIG. 6 is a diagram showing a first embodiment in which a 2-way handshake (2WH) condition is achieved in the random access method based on analog network coding according to an embodiment of the present invention.

Referring to FIG. 6, when two terminal stations desiring to exchange information using ANC are a first terminal station and a second terminal station, the first terminal station transmits a second data packet for ANC (packet for actual ANC communication) in the first slot of frame 1 at step S610. Here, when the second data packet has been transmitted in the first slot without causing a collision with other data packets, the second terminal station may recognize that the first terminal station has successfully transmitted the packet for ANC communication thereto via the monitoring of the signal received in the first slot or the monitoring of frame 1.

Thereafter, the second terminal station sends a response message for ANC communication with the first terminal station in the first slot of frame 2 at step S620.

If the data packet transmitted from the first terminal station has been successfully received in the first slot of frame 1, and a response message sent from the second terminal station has been completely received in the first slot of frame 2, the first terminal station and the second terminal station start communicating with each other using ANC from the first slot of frame 3 at step S630.

Figure 7:
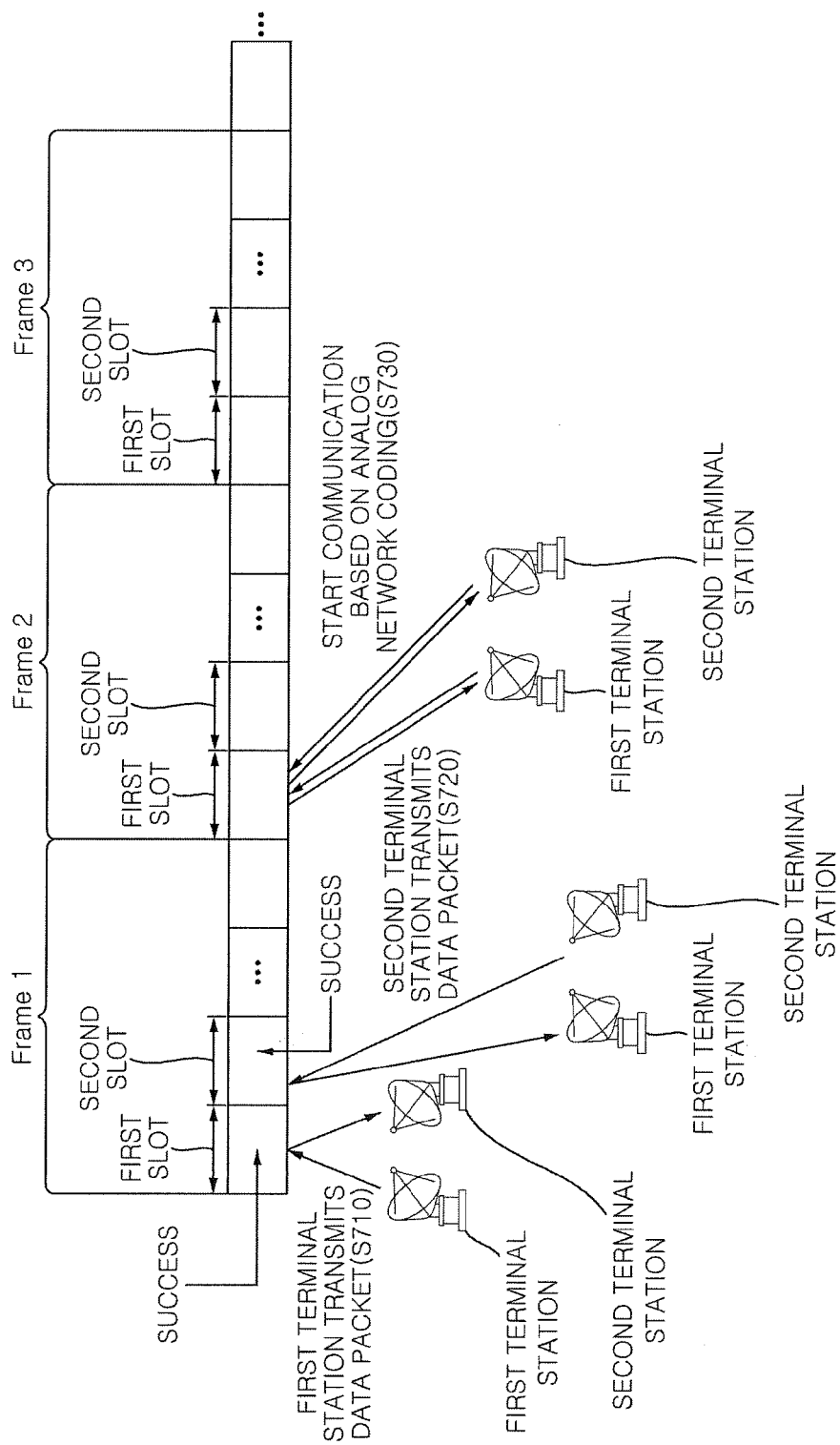
FIG. 7 is a diagram showing a 2WH protocol process according to a second embodiment of the present invention.

Although the random access method and apparatus based on ANC, provided in the present invention, have been mostly described based on an ANC communication method performed in the same manner as that of the embodiment of FIG. 6, such a communication method is only an embodiment, and those skilled in the art may perform various changes and modifications from the above description. In FIG. 7, another example in which a 2WH condition is achieved using another method is illustrated.

FIG. 7 is a diagram showing a second embodiment in which a 2WH condition is achieved in the random access method based on analog network coding according to the embodiment of the present invention.

Referring to FIG. 7, each of the first terminal station and the second terminal station transmits a data packet for ANC communication. In this case, when the data packet from the first terminal station has been successfully transmitted in the first slot of frame 1 at step S710, and the data packet from the second terminal station has been successfully transmitted in the second slot of frame 1 at step S720, the first terminal station and the second terminal station start communicating with each other using ANC in the first slot of frame 2, which is a subsequent frame, at step S730. In this case, as a common slot required for ANC communication, the first slot or the second slot may be selected. Here, which slot is to be selected is determined depending on prescribed rules, and reserving the slot having the lower slot number may be an example of such selection.

The ANC communication method of FIG. 7 is characterized in that ANC communication is initiated one frame earlier than the ANC communication method of FIG. 6. Here, the embodiment of FIG. 7 may be implemented even in the case where a slot is selected between the first terminal station and the second terminal station and a data packet is transmitted depending on prescribed rules, and may be implemented even in the case where each of the first terminal station and the second terminal station accidently attempts to reserve a slot for ANC in the same frame.

Further, in the case of FIG. 7, a data packet transmitted from the first terminal station (S710) is regarded as a first data packet trying a preliminary reserved slot, and a data packet successfully transmitted from the second terminal station in another slot of the same frame (S720) is regarded as a response message, and thus it may be considered that the 2WH condition has been achieved.

Meanwhile, the data packet transmission unit 120 allows the first terminal station to transmit a second data packet for analog network coding (packet for actual ANC communication) in the first slot, which has been decided on as the reserved slot, over the communication network. The received signal determination unit 110 allows the first terminal station to receive a signal, to which analog network coding is applied, in the first slot. Further, the data packet decoding unit 150 allows the first terminal station to apply an interference cancellation technique based on the second data packet to the signal received in the first slot and then decodes a third data packet transmitted from the second terminal station for analog network coding.

That is, the signals (i.e. data packets) respectively transmitted from the first terminal station and the second terminal station for analog network coding overlap each other while passing through a satellite relay. The overlapping signal is simply amplified by the satellite relay and is then transmitted to the first terminal station and to the second terminal station individually. At this time, the first terminal station may detect the signal transmitted from the second terminal station by eliminating the signal transmitted by the first terminal station (i.e. the second data packet) from the overlapping received signal. Therefore, as described above, technology for eliminating the signal itself (i.e. the second data packet) transmitted by a relevant terminal station from the overlapping received signal is referred to as "interference cancellation (IC) technology." The data packet decoding unit 150 allows the first terminal station to apply the interference cancellation technique based on the second data packet to the signal received in the first slot and then decodes the third data packet transmitted from the second terminal station for ANC. That is, at this time the third data packet is a data packet for ANC, which is transmitted from the second terminal station, received by the first terminal station, and decoded by applying the interference cancellation technique to the overlapping signal.

Meanwhile, the data packet transmission unit 120 allows the first terminal station to transmit a second data packet for analog network coding (packet for actual ANC communication) in the first slot, which has been decided on as the reserved slot, over the communication network. In this case, the second data packet may include a sequence code (i.e. keep-on sequence) allowing terminal stations other than the first terminal station and the second terminal station, which is the counterpart of communication based on analog network coding, to recognize that the first slot is a reserved slot for communication based on analog network coding. That is, all terminals other than the terminals forming the ANC pair may determine that the relevant slot has been reserved by receiving the keep-on sequence, thus preventing unintentional packet collisions from occurring.

The present invention may further include a sequence code definition unit (not shown) for allowing the first terminal station to define a sequence code (i.e. keep-on sequence) that is to be utilized as the preamble and the postamble of a second data packet for analog network coding in the first slot, which has been decided on as the reserved slot. The data packet transmission unit 120 allows the first terminal station to transmit the second data packet, in which the sequence code is included, over the communication network in the first slot. That is, the sequence code is utilized as the preamble and postamble of each packet that is transmitted during ANC communication. Here, the sequence code may be implemented as a pseudo-noise code, and has the characteristic of being defined so as to be distinguishable from an existing preamble and an existing postamble. In ANC communication, the first terminal station and the second terminal station must be able to decode data packets of their counterparts, and thus the sequence code of the present invention is included not only when the first terminal station transmits a second data packet, but also when the second terminal station transmits a third data packet.

Also, the received signal determination unit 110 allows the first terminal station to receive a signal to which analog network coding is applied in the first slot. The data packet decoding unit 150 allows the first terminal station to apply an interference cancellation technique to the signal received in the first slot while using the sequence code as a synchronization signal, and then decodes the third data packet transmitted from the second terminal station for analog network coding. That is, the sequence code (i.e. keep-on sequence) is used as a synchronization signal for interference cancellation, and the ANC pair is capable of estimating channel values using the sequence code, and acquires synchronization for interference cancellation.

In order to desirably perform the function of the sequence code, at least part of each of the sequence codes (keep-on sequences) of data packets for ANC that are transmitted from the first terminal station and the second terminal station, respectively, must be received without interference. For this, ANC-ALOHA, as proposed in the present invention, uses a reduced payload size and delayed transmission.

The data packet transmission unit 120 allows the first terminal station to transmit the second data packet earlier or later than the third data packet, transmitted from the second terminal station for analog network coding, in order to receive at least part of the sequence code without interference.

That is, the second data packet is a data packet for ANC transmitted from the first terminal station, and the third data packet is a data packet for ANC transmitted from the second terminal station, and thus the data packet transmission unit 120 may transmit the second data packet earlier or later than the third data packet. At this time, which one of the terminal stations will be used to transmit a data packet earlier or later (advanced transmission or delayed transmission) may be determined depending on the sequence of 2WH. That is, in an embodiment of the present invention, since the first terminal station transmits a data packet earlier than does the second terminal station, the third data packet transmitted from the second terminal station may preferably be transmitted later than the second data packet.

In other words, the response message reception unit 140 of the present invention is configured such that, if the first data packet from the first terminal station has been transmitted in the first slot without causing a collision, the first terminal station may receive a response message sent from the second terminal station, which is a counterpart of communication based on analog network coding, in the first slot of a subsequent frame or the second slot of a current frame. The data packet transmission unit 120 may determine whether to transmit the second data packet earlier or later than the third data packet depending on the sequence of the 2-way handshake protocol, in which the response message is sent or received between the first terminal station and the second terminal station, and may then transmit the second data packet.

The data packet transmission unit 120 allows the first terminal station to transmit the second data packet, with the size of the payload of the second data packet being reduced, in order to receive at least part of the sequence code without interference.

In other words, the data packet transmission unit 120 uses a method of reducing the payload size (reduced payload size) of a data packet and of performing delayed transmission in order to receive at least part of the sequence code (keep-on sequence) of each of data packets for ANC, respectively transmitted from the first terminal station and the second terminal station, without interference.

More specifically, the reduced payload size literally denotes a reduction in the size of the payload of a packet transmitted in ANC communication, wherein the payload size is reduced by an amount corresponding to the sum of a preamble size and a guard time. Further, delayed transmission denotes a delay in transmission, wherein one of two ANC packets respectively transmitted from terminals forming an ANC pair is delayed from a slot boundary by a time corresponding to the sum of the preamble size and the guard time, and is then transmitted.

Figure 2:
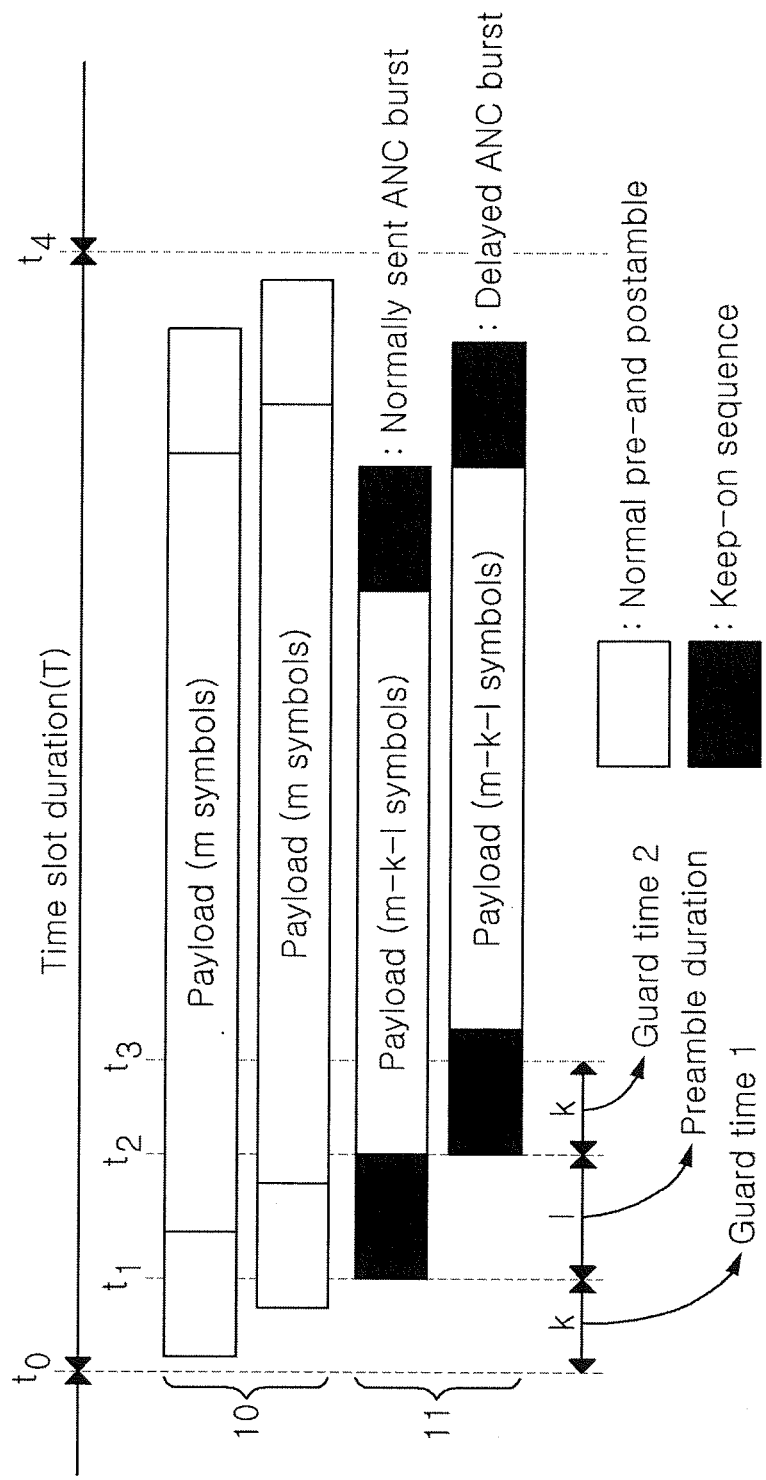
FIG. 2 is a diagram showing an example of packet transmission according to an embodiment of the present invention.

FIG. 2 is a diagram showing an example of packet transmission according to an embodiment of the present invention.

Referring to FIG. 2, FIG. 2 illustrates the transmission of packets in a time slot upon utilizing the ANC-ALOHA technique proposed in the present invention, wherein a guard time and a preamble are implemented as a duration denoted by the symbol k and a duration denoted by the symbol l, respectively. Therefore, when the size of the payload of an existing packet is m symbols, the size of the payload of an ANC packet is m-k-l symbols.

Packets 10 of FIG. 2 illustrates the conventional transmission of packets, wherein it can be seen that, when two packets are transmitted in the same slot, the overlapping portion between the two packets is considerably wide, thus causing interference with a preamble and a postamble. In contrast, packets 11 of FIG. 2 illustrates the transmission of packets to which ANC-ALOHA proposed in the present invention is applied. It can be seen that a single packet is delayed and transmitted, so that the preamble of a previously transmitted ANC packet and the postamble of a subsequently transmitted (delayed and transmitted) ANC packet are respectively received without interference. By means of this, it can be seen that sequence codes (keep-on sequences) are received without interference, and such sequence codes may function to reserve channels and estimate channel values. In this regard, when each of the first terminal station and the second terminal station uses a pseudo-noise (PN) code or a spreading code as a sequence code, channel values may be estimated based on the part of the sequence code that is received without interference.

Hereinafter, a random access method based on analog network coding according to an embodiment of the present invention will be described in brief based on the above-described contents.

Figure 3:
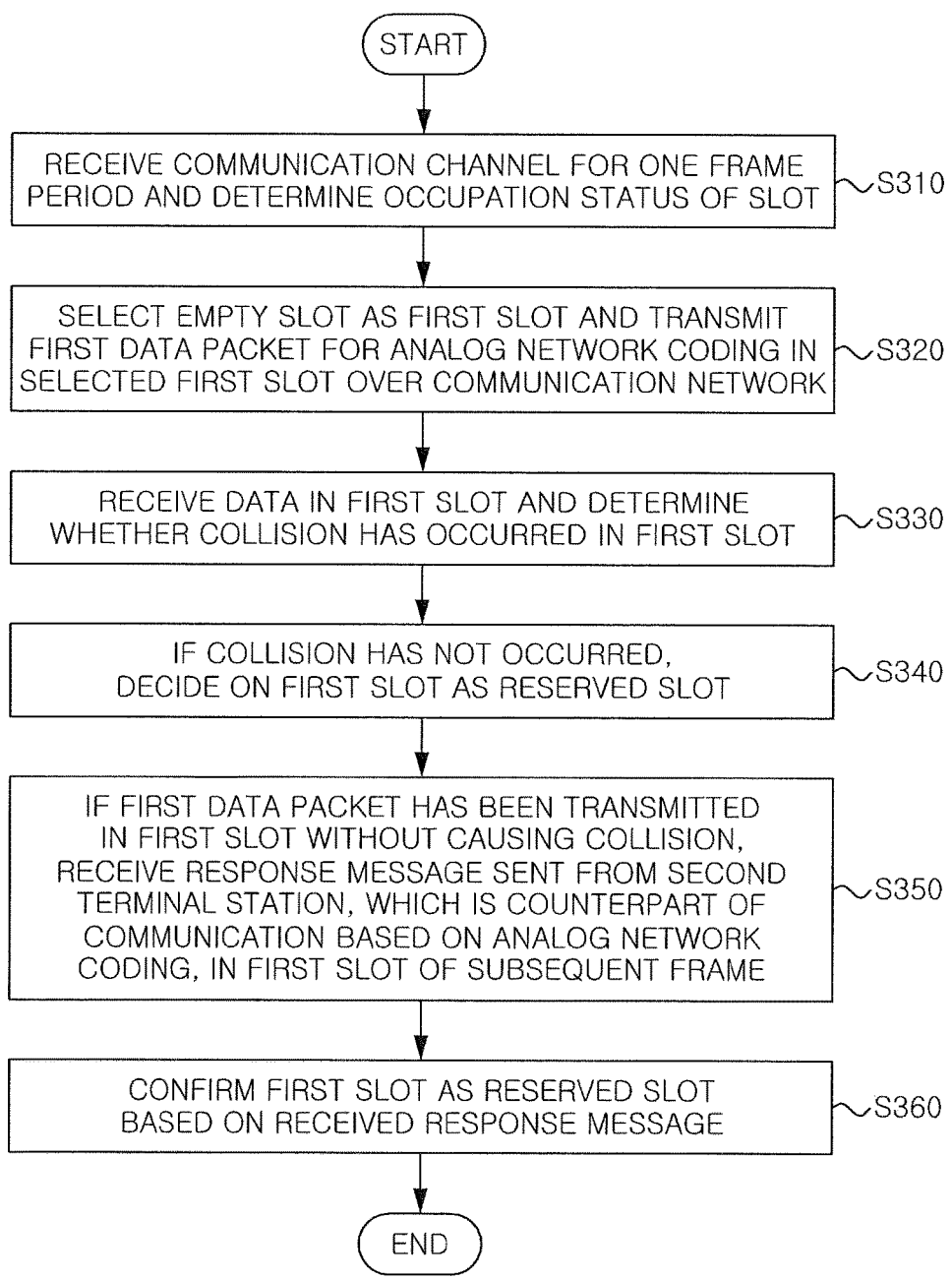
FIG. 3 is an operation flowchart showing a random access method based on analog network coding for a satellite network according to an embodiment of the present invention.

FIG. 3 is a flowchart showing a random access method based on analog network coding for a satellite network according to an embodiment of the present invention.

Referring to FIG. 3, in the random access method based on analog network coding according to the present invention, the received signal determination unit 110 allows the first terminal station (i.e. the transmitting side of an ANC pair) to receive a communication channel for one frame period of a communication network, and then determines the status of occupation of a slot at step S310.

Next, the data packet transmission unit 120 allows the first terminal station to select an empty slot as a first slot and transmits a first data packet for analog network coding (i.e. a data packet for reservation of an empty slot) in the selected first slot over the communication network at step S320.

Here, the first slot denotes the number of a slot in a frame. For example, when slot No. 3 is decided on as the first slot, slot No. 3 is still the first slot in a subsequent frame.

Then, the received signal determination unit 110 allows the first terminal station to receive data in the first slot in which the first data packet is transmitted, and determines whether a collision has occurred between the transmitted first data packet and any additional data packet in the first slot at step S330.

The reserved slot decision unit 130 allows the first terminal station to decide on the first slot as a reserved slot if no collision has occurred between the transmitted first data packet and the additional data packet in the first slot at step S340.

In this case, the reserved slot decision unit 130 decides on the first slot as a preliminary reserved slot when the first terminal station successfully transmits a data packet for ANC communication in the first slot. Afterwards, if data packets for ANC communication respectively transmitted from the first terminal station and the second terminal station have been received in the first slot without causing a collision, that is, if data packets transmitted not only from the first terminal station but also from the second terminal station in the first slot have been successfully received, the first slot, decided on as the preliminary reserved slot, may be confirmed as a reserved slot. Further, terminals forming an ANC pair perform communication based on ANC from the frame following the first slot confirmed as the reserved slot, which means that two terminals desiring to exchange information with each other using ANC, that is, the ANC pair (i.e. the first terminal station and the second terminal station), have achieved a 2-way handshake (2WH) condition, in which a single slot is reserved to utilize the slot for ANC communication.

Next, when the first data packet from the first terminal station has been transmitted in the first slot without causing a collision, the response message reception unit 140 allows the first terminal station to receive a response message sent from the second terminal station, which is the counterpart of communication based on analog network coding, in the first slot of a subsequent frame or the second slot of the current frame at step S350.

Here, the condition in which the second terminal station sends a response message will be described below. That is, the second terminal station may monitor in real time the status of each slot and determine whether a signal received in the slot is a data packet directed thereto. Accordingly, the second terminal station is configured to, if it is determined that the data packet directed thereto is a packet for ANC and is also a signal that was successfully received in the first slot without causing a collision, send a response message in response to the signal. Here, any other terminal stations as well as the second terminal station may be provided with a function of monitoring the status of each slot and determining received signals.

In other words, the condition in which the second terminal station sends a response message is that the second terminal station itself determines a received signal, rather than 'in response to the step where the reserved slot decision unit 130 allows the first terminal station to decide on the first slot as the preliminary reserved slot', and sends the corresponding response message to the received signal when the data packet directed to the second terminal station is a packet for ANC and is also a signal that was successfully received in the first slot without causing a collision. The second terminal station indicates whether ANC is available by sending a response message. Meanwhile, if the ANC pair is unavailable for communication, the first slot remains as an empty slot and reservation is naturally released.

Next, the reserved slot decision unit 130 allows the first terminal station to confirm the first slot as a reserved slot from the preliminary reserved slot, based on the received response message at step S360.

The difference between the preliminary reserved slot and the reserved slot in this case will be described below. As described above, in order to apply ANC to random access, the problem in which terminal stations of the ANC pair must access the same slot (hereinafter referred to as a 'first slot') must be solved. At this time, ANC communication is not necessarily performed even if the first terminal station transmits a data packet for ANC communication in the first slot. That is, if the first terminal station has successfully transmitted a data packet for ANC communication in the first slot and then the second terminal station successfully transmits a data packet for ANC communication in the first slot, that is, when data packets for ANC communication respectively transmitted from the first terminal station and the second terminal station are received in the first slot without causing a collision, the first slot is finally confirmed as a reserved slot for ANC communication.

Therefore, in the present invention, the case where the first terminal station successfully transmits a data packet for ANC communication in the first slot is represented by the case where the first slot has been decided on as a preliminary reserved slot. Further, the case where data packets for ANC communication, respectively transmitted from the first terminal station and the second terminal station, are received in the first slot without causing any collision, that is, the case where the data packets transmitted from not only the first terminal station, but also the second terminal station in the first slot have been successfully received, is represented by the case where the first slot is confirmed as a reserved slot.

Figure 4:
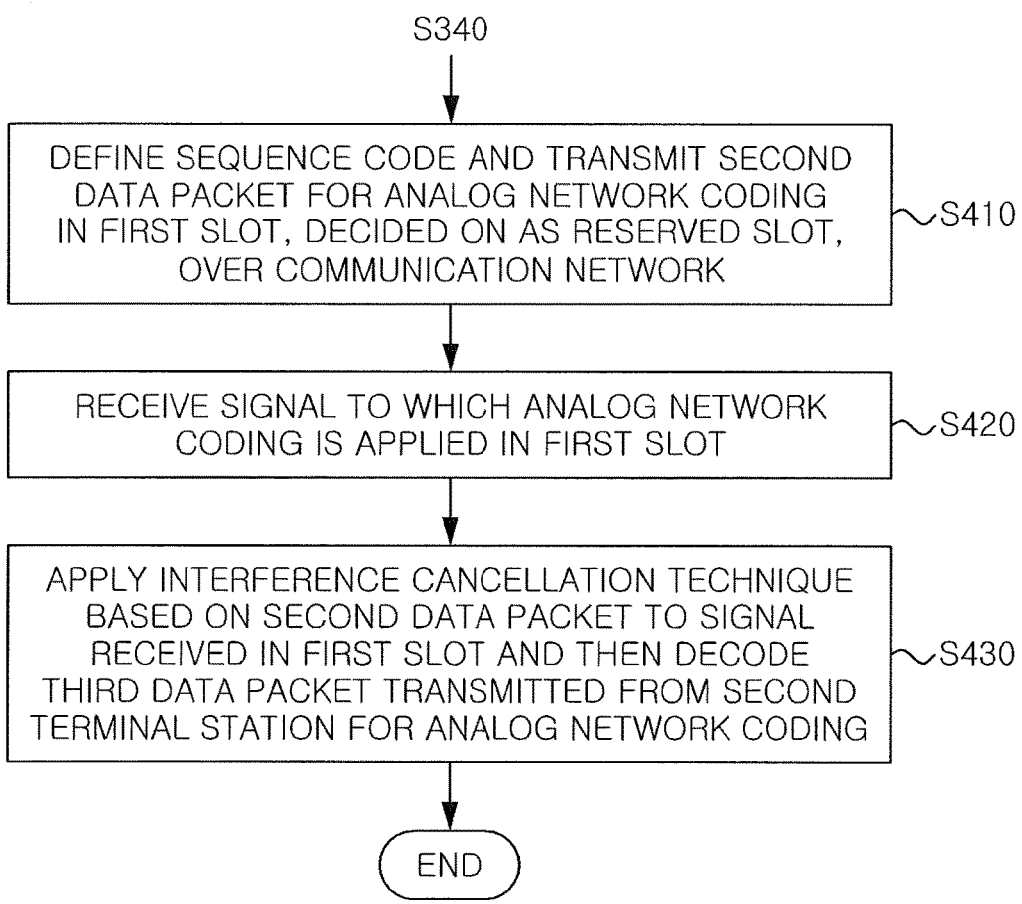
FIG. 4 is an operation flowchart showing a process for decoding a third data packet as a random access method based on analog network coding according to another embodiment of the present invention.

Meanwhile, FIG. 4 is a flowchart showing the flow of a process for decoding a third data packet according to an embodiment of the present invention.

Referring to FIG. 4, prior to step S410, steps S310 to S340 of FIG. 3 may be performed in the same manner, and thus a description thereof will be omitted.

The data packet transmission unit 120 allows the first terminal station to transmit a second data packet for ANC (packet for actual ANC communication) in the first slot, decided on as the reserved slot, over the communication network at step S410.

In this case, the second data packet includes a sequence code (i.e. keep-on sequence) allowing terminal stations other than the first terminal station and the second terminal station, which is the counterpart of communication based on analog network coding, to recognize that the first slot is the reserved slot for communication based on analog network coding. All terminals other than the terminals forming the ANC pair may determine that the corresponding slot has been reserved by receiving a keep-on sequence, thus preventing unintentional packet collisions from occurring via such determination.

The present invention may further include a sequence code definition unit (not shown) for allowing the first terminal station to define a sequence code (i.e. keep-on sequence) that is to be utilized as the preamble and the postamble of the second data packet for analog network coding in the first slot, which has been decided on as the reserved slot. At step S410, the data packet transmission unit 120 allows the first terminal station to transmit the second data packet, in which the sequence code is included, over the communication network in the first slot. The sequence code is utilized as the preamble and postamble of each packet that is transmitted during ANC communication. Here, the sequence code may be implemented as a pseudo-noise code, and may be defined by the sequence code definition unit so as to be distinguishable from an existing preamble and an existing postamble.

When the sequence code is a pseudo-noise code or a spreading code, the sequence code may function to notify terminal stations other than the first terminal station and the second terminal station that the slot has been reserved for analog network coding. In this case, unless the sequence is received intact, the first terminal station and the second terminal station simultaneously transmit signals in the first slot, so that other terminal stations recognize that a collision has occurred in the first slot and have the possibility of transmitting signals in the first slot of a subsequent frame. Accordingly, in order to prevent the possibility of a collision, at least part of the sequence code must be received intact in the first slot.

Further, when the sequence code is a PN code or a spreading code, if at least part of the sequence code is received intact, channel information may be estimated by means of the received sequence code, so that the first terminal station and the second terminal station do not need to receive additional channel information and may acquire the channel information of their counterparts from the relevant frame and the relevant slot, thus performing ANC communication without interruption.

Meanwhile, at step S410, a sequence code is included in the second data packet transmitted over the communication network. To desirably perform the function of the sequence code, at least part of each of the sequence codes (keep-on sequences) of data packets for ANC that are transmitted from the first terminal station and the second terminal station, respectively, must be received without interference. For this, the data packet transmission unit 120 uses a method of reducing the payload size (reduced payload size) of a data packet and delaying and transmitting a packet (delayed transmission).

More specifically, the data packet transmission unit 120 allows the first terminal station to transmit the second data packet earlier or later than a third data packet, which is transmitted from the second terminal station for ANC, in order to receive at least part of the sequence code without interference. At this time, the data packet transmission unit 120 may delay one of two ANC packets, transmitted from respective terminals of the ANC pair, from a slot boundary by a time corresponding to the sum of a preamble size and a guard time, and may then transmit the delayed ANC packet. Further, which one of the terminal stations will be used to transmit a data packet earlier or later may be determined depending on the sequence of 2WH.

In other words, the data packet transmission unit 120 may determine whether to transmit the second data packet earlier or later than the third data packet depending on the sequence of a 2-way handshake protocol in which the response message is transmitted or received between the first terminal station and the second terminal station.

Also, the data packet transmission unit 120 allows the first terminal station to transmit the second data packet, with the size of the payload of the second data packet being reduced, so as to receive at least part of the sequence code without interference. In this case, the data packet transmission unit 120 may reduce the size of the payload of the data packet by an amount corresponding to the sum of the preamble size and the guard time.

Meanwhile, the example of packet transmission to which the technology of the present invention (method of reducing the length of a payload and delaying and transmitting a packet) is applied is presented in the description made with reference to FIG. 2. Thus, a detailed description thereof will be omitted.

Next, the received signal determination unit 110 allows the first terminal station to receive a signal, to which ANC is applied, in the first slot at step S420. Here, the signal to which ANC is applied denotes an overlapping signal amplified via the satellite relay, that is, the signal in which the second data packet transmitted from the first terminal station and the third data packet transmitted from the second terminal station overlap each other.

Thereafter, the data packet decoding unit 150 allows the first terminal station to apply an interference cancellation technique based on the second data packet to the signal received in the first slot and then decodes the third data packet transmitted from the second terminal station for ANC at step S430. The third data packet is a data packet for ANC transmitted from the second terminal station.

Further, at step S430, the data packet decoding unit 150 allows the first terminal station to apply an interference cancellation technique to the signal received in the first slot while using the sequence code as a synchronization signal, and then decodes the third data packet transmitted from the second terminal station for ANC. That is, the sequence code (i.e. keep-on sequence) is used as a synchronization signal for interference cancellation, and the ANC pair is capable of estimating channel values by utilizing the sequence code and acquires synchronization for interference cancellation.

As described above, the present invention relates to a random access method and apparatus based on analog network coding for a satellite network, and is advantageous in that random access technology capable of guaranteeing high channel usage efficiency when applied to a satellite positioning/communications convergence system may be provided.

The present invention is advantageous in that analog network coding (ANC) technology is applied to satellite random access, thus improving throughput.

The present invention is advantageous in that it can solve a problem occurring when channel reservation for ANC is performed using conventional R-ALOHA technology, that is, a problem in which information inside a packet cannot be determined by terminals other than terminals forming an ANC pair due to the transmission of overlapping signals for ANC execution and, as a result, the other terminals cannot determine whether a relevant slot is a slot in which communication based on ANC is performed or a slot in which packets are colliding with each other.

Further, the present invention is advantageous in that it can solve a conventional problem that may occur when ANC is applied to random access, that is, a problem in which, even if two terminals desiring to exchange information using ANC (i.e. an ANC pair) must access the same slot, it is difficult to guarantee that the terminals of the ANC pair simultaneously access a single slot due to the characteristics of contention-based random access, and in which, when terminals other than the ANC pair simultaneously access the same slot even if the terminals of the ANC pair simultaneously access the slot, ANC cannot be utilized due to unintentional packet collisions. Furthermore, the present invention is advantageous in that it can solve a problem in which, when a physical layer cannot estimate precise channel values (e.g. frequency, phase, amplitude, etc.) for a channel in which each packet is transmitted, the resultant error acts as an interference factor and then the packet cannot be recovered, even if interference cancellation technology is applied.

The present invention was contrived based on research that was conducted as part of the University IT Research Center (ITRC) Development Support Project and Mid-Career Researcher Project (national leading-challenge) of the Ministry of Science, ICT and Future Planning (MSIP), the National IT Industry Promotion Agency (NIPA), and the National Research Foundation of Korea [project management number: 1415128749, 2013R1A2A1A01016423; project title: national defense IT tactical communication technology research, positioning/communications convergence technology using aerospace node communication relay].

The random access method based on analog network coding for a satellite network according to the embodiment of the present invention may be implemented in the form of program instructions that can be executed via various computer means, and may be stored in a computer-readable medium. The computer-readable medium may include one of program instructions, data files, and data structures or program instructions, data files, and data structures in combination. The program instructions recorded in the computer-readable medium may be program instructions that are specially designed and configured for the present invention or that are well known to and can be used by those having ordinary knowledge in the field of computer software. Examples of the computer-readable medium includes magnetic media such as a hard disk, a floppy disk and magnetic tape, optical media such as CD-ROM and a DVD, magneto-optical media such as a floptical disk, and hardware devices that are specially configured to store and execute program instructions, such as ROM, RAM, and flash memory. The examples of the program instructions include not only machine language code that is generated by a complier, but also high-level language that can be executed by a computer. The above-described hardware apparatus may be configured to operate as one or more software modules in order to perform the operation of the present invention, and vice versa.

Although the present invention has been described with reference to specific contents, such as detailed components, the above description is intended merely to help the overall understanding of the present invention, the present invention is not limited to the above embodiments, and those having ordinary knowledge in the technical field to which the present invention pertains can perform variations and modifications in various manners from the above description.

Accordingly, the spirit of the present invention should not be limited to the above-described embodiments, and the accompanying claims and equal or equivalent modifications thereof should be interpreted as falling within the range of the spirit and scope of the present invention.

What is claimed is:

1. A random access method based on analog network coding, comprising:
   receiving, by a first terminal station, a communication channel for one frame period of a communication network and determining a status of occupation of each slot;
   selecting, by the first terminal station, an empty slot as a first slot, and transmitting a first data packet for analog network coding hi the selected first slot over the communication network;
   receiving, by the first terminal station, data in the first slot in which the first data packet is transmitted, and determining whether a collision has occurred between the transmitted first data packet and any additional data packet in the first slot;
   deciding on, by the first terminal station, the first slot as a reserved slot if a collision has not occurred in the first slot and the first slot as not a reserved slot if a collision has occurred hi the first slot; and
   transmitting, by the first terminal station, a second data packet for analog network coding in the first slot, decided on as the reserved slot, over the communication network,
   wherein the second data packet includes a sequence code allowing terminal stations other than the first terminal station and a second terminal station, which is a counterpart of communication based on analog network coding, wherein the first slot is a specific slot randomly accessed by the first terminal station and a reserved slot for communication based on analog network coding.

2. The random access method of claim 1, further comprising:
   if the first data packet from the first terminal station has been transmitted in the first slot without causing a collision, receiving, by the first terminal station, a response message sent from a second terminal station, which is a counterpart of communication based on analog network coding, in the first slot of a subsequent frame or in a second slot of a current frame; and
   confirming, by the first terminal station, the first slot as the reserved slot, based on the received response message.

3. The random access method of claim 1, further comprising:
   transmitting, by the first terminal station, a second data packet for analog network coding in the first slot, decided on as the reserved slot, over the communication network;
   receiving, by the first terminal station, a signal to which analog network coding is applied in the first slot; and
   applying, by the first terminal station, an interference cancellation technique based on the second data packet to the signal received in the first slot and then decoding a third data packet, transmitted from the second terminal station for analog network coding.

4. The random access method of claim 1, further comprising:
   defining, by the first terminal station, a sequence code to be utilized as a preamble and a postamble of a second data packet for analog network coding in the first slot, decided on as the reserved slot; and
   transmitting, by the first terminal station, the second data packet including the sequence code in the first slot over the communication network.

5. The random access method of claim 4, wherein transmitting the second data packet over the communication network comprises:
   transmitting, by the first terminal station, the second data packet earlier or later than a third data packet, transmitted from the second terminal station for analog network coding, so as to receive at least part of the sequence code without interference.

6. The random access method of claim 5, further comprising:
   if the first data packet from the first terminal station has been transmitted in the first slot without causing a collision, receiving, by the first terminal station, a response message sent from the second terminal station, which is a counterpart of communication based on analog network coding, in the first slot of a subsequent frame or in a second slot of a current frame,
   wherein transmitting the second data packet over the communication network comprises determining whether to transmit the second data packet earlier or later than the third data packet, depending on a sequence of a 2-way handshake protocol, in which the response message is sent or received between the first terminal station and the second terminal station.

7. The random access method of claim 4, wherein transmitting the second data packet over the communication network comprises:
   transmitting, by the first terminal station, the second data packet, with a payload size of the second data packet being reduced, so as to receive at least part of the sequence code without interference.

8. The random access method of claim 1, further comprising:
receiving, by the first terminal station, a signal to which analog network coding is applied in the first slot; and
applying, by the first terminal station, an interference cancellation technique to the signal received in the first slot while using the sequence code as a synchronization signal, and then decoding a third data packet, transmitted from the second terminal station for analog network coding.

9. A random access apparatus based on analog network coding, comprising a processor and a memory that is coupled with the processor and to store instructions executed in the processor, the processor configured to:
receive a communication channel for one frame period of a communication network and determining a status of occupation of each slot for a first terminal station;
select an empty slot as a first slot; and transmitting a first data packet for analog network coding in the selected first slot over the communication network for the first terminal station; and
decide on the first slot as a reserved slot for the first terminal station if a collision has not occurred in the first slot and the first slot as not a reserved slot if a collision has occurred in the first slot,
wherein the processor allows the first terminal station to receive data in the first slot, in which the first data packet is transmitted, and determines whether a collision has occurred between the transmitted first data packet and any additional data packet in the first slot,
the processor is further configured to define a sequence code to be utilized as a preamble and a postamble of a second data packet for analog network coding in the first slot decided on as the reserved slot,
wherein the processor allows the first terminal station to transmit the second data packet including the sequence code in the first slot over the communication network, the first slot is a specific slot randomly accessed by the first terminal station and a reserved slot for communication based on analog network coding.

10. The random access apparatus of claim 9, the processor is further configured to receive a response message sent from a second terminal station, which is a counterpart of communication based on analog network coding, in the first slot of a subsequent frame or in a second slot of a current frame, if it is determined that the first data packet from the first terminal station has been transmitted in the first slot without causing a collision,
wherein the processor allows the first terminal station to confirm the first slot as a reserved slot, based on the received response message.

11. The random access apparatus of claim 9, the processor is further configured to apply an interference cancellation technique based on a second data packet to the signal received in the first slot and then decoding a third data packet, transmitted from a second terminal station for analog network coding,
wherein the processor allows the first terminal station to transmit the second data packet for analog network coding in the first slot, decided on as the reserved slot, over the communication network, and the received signal determination unit allows the first terminal station to receive a signal to which analog network coding is applied in the first slot.

12. The random access apparatus of claim 9, wherein:
the processor allows the first terminal station to transmit a second data packet for analog network coding in the first slot, decided on as the reserved slot, over the communication network, and
the second data packet includes a sequence code allowing terminal stations other than the first terminal station and a second terminal station, which is a counterpart of communication based on analog network coding, to recognize that the first slot is a reserved slot for communication based on analog network coding.

13. The random access apparatus of claim 12, wherein:
the processor allows the first terminal station to receive a signal to which analog network coding is applied in the first slot, and
the processor allows the first terminal station to apply an interference cancellation technique to the signal received in the first slot while using the sequence code as a synchronization signal, and then decodes a third data packet, transmitted from the second terminal station for analog network coding.

14. The random access apparatus of claim 9, wherein the processor allows the first terminal station to transmit the second data packet earlier or later than a third data packet, transmitted from the second terminal station for analog network coding, so as to receive at least part of the sequence code without interference.

15. The random access apparatus of claim 14, the processor is further configured to receive a response message sent from the second terminal station, which is a counterpart of communication based on analog network coding, in the first slot of a subsequent frame or in a second slot of a current frame, if the first data packet from the first terminal station has been transmitted in the first slot without causing a collision,
wherein the processor determines whether to transmit the second data packet earlier or later than the third data packet depending on a sequence of a 2-way handshake protocol, in which the response message is sent or received between the first terminal station and the second terminal station.

16. The random access apparatus of claim 9, wherein the processor allows the first terminal station to transmit the second data packet, with a payload size of the second data packet being reduced, so as to receive at least part of the sequence code without interference.

* * * * *